United States Patent
Brostrom (10) Patent No.: US 10,924,282 B2
(45) Date of Patent: Feb. 16, 2021

(54) SYSTEM AND METHOD FOR MEASURING AND REPORTING IOT BOOT INTEGRITY

(71) Applicant: Cyber Pack Ventures, Inc., Columbia, MD (US)

(72) Inventor: Thomas Edward Brostrom, Ellicott City, MD (US)

(73) Assignee: Cyber Pack Ventures, Inc., Columbia, MD (US)

( * ) Notice: Subject to any disclaimer, the term of this patent is extended or adjusted under 35 U.S.C. 154(b) by 70 days.

(21) Appl. No.: 16/420,435

(22) Filed: May 23, 2019

(65) Prior Publication Data

US 2019/0363888 A1 Nov. 28, 2019

Related U.S. Application Data

(60) Provisional application No. 62/675,991, filed on May 24, 2018, provisional application No. 62/744,410, filed on Oct. 11, 2018, provisional application No. 62/793,190, filed on Jan. 16, 2019.

(51) Int. Cl.
*H04L 29/06* (2006.01)
*H04L 9/32* (2006.01)
*H04L 9/00* (2006.01)

(52) U.S. Cl.
CPC ............ *H04L 9/3234* (2013.01); *H04L 9/002* (2013.01); *H04L 9/3236* (2013.01)

(58) Field of Classification Search
CPC ...... H04L 9/3234; H04L 9/002; H04L 9/3236
See application file for complete search history.

(56) References Cited

U.S. PATENT DOCUMENTS

| | | |
|---|---|---|
| 6,988,250 B1 | 1/2006 | Proudler et al. |
| 7,194,626 B2 | 3/2007 | Craft |
| 7,971,048 B2 | 6/2011 | Datta et al. |

(Continued)

OTHER PUBLICATIONS

Winternitz, A Secure One-way Hash Function Built from DES, 1984, Stanford University.

(Continued)

*Primary Examiner* — Ghodrat Jamshidi
(74) *Attorney, Agent, or Firm* — Clyde Findley (57) ABSTRACT

Embodiments of the present invention are directed to an improved system and method of producing, recording and reporting boot integrity measurements of an Internet of Things ("IoT") computing device to resource (such as an on-chip software module, an external software module, a printer, a network router, or a server), so the resource can confirm that the IoT computing device can be trusted before access to the resource is granted. Embodiments provide a new and less expensive architecture for reliably collecting and relaying device state information to support trust-sensitive applications. Embodiments leverage crypto-acceleration modules found on many existing microprocessors and microcontroller-based IoT devices, while introducing little additional overhead or additional circuitry. Embodiments provide a Root of Trust module comprising integrated internal control logic that functions as a secure on-chip wrapper for cryptographic primitive modules, which provide secure storage and reporting of the host's platform integrity measurements.

4 Claims, 7 Drawing Sheets

(56) References Cited

U.S. PATENT DOCUMENTS

| | | | |
|---|---|---|---|
| 9,405,912 B2 | 8/2016 | Novak et al. | |
| 10,565,382 B1* | 2/2020 | Diamant | G06F 21/575 |
| 2007/0226505 A1* | 9/2007 | Brickell | G06F 21/57 |
| | | | 713/176 |
| 2008/0005574 A1* | 1/2008 | Cheng | G06F 21/57 |
| | | | 713/181 |
| 2014/0169560 A1* | 6/2014 | Stotzer | H04W 12/08 |
| | | | 380/270 |
| 2015/0304736 A1* | 10/2015 | Lal | G06F 21/72 |
| | | | 380/210 |
| 2015/0347768 A1* | 12/2015 | Martin | G06F 21/10 |
| | | | 726/1 |
| 2016/0179554 A1* | 6/2016 | Khosravi | G06F 9/441 |
| | | | 726/1 |
| 2017/0200010 A1* | 7/2017 | Fu | G06F 9/4406 |
| 2017/0206174 A1* | 7/2017 | Keranen | H04L 9/0877 |
| 2018/0254898 A1* | 9/2018 | Sprague | H04L 9/3271 |
| 2018/0288101 A1* | 10/2018 | Sharma | H04L 63/205 |
| 2018/0365069 A1* | 12/2018 | Nemiroff | H04L 9/0844 |
| 2018/0365422 A1* | 12/2018 | Callaghan | H04L 63/0442 |
| 2018/0365424 A1* | 12/2018 | Callaghan | G06F 21/575 |

OTHER PUBLICATIONS

Aaraj, Raghunathan, Jha, Analysis and Design of a Hardware/Software Trusted Platform Module for Embedded Systems, 2008, ACM Transactions on Embedded Computing Systems, vol. 8, No. 1, Article 8.
Hamadeh, Chaudhuri, Tyagi, Area, Energy, and Time Assessment for a Distributed TPM for Distributed Trust in IoT Clusters, 2015, IEEE Int'l Symposium on Nanoelectronic and Information Systems.
N/A, Building a Secure System Using TrustZone Technology, 2009, ARM Security Technology.
Lemay, Gunter Cumulative Attestation Kernels for Embedded Systems, 2012, IEEE Transactions on Smart Grid, vol. 3, No. 2.
Regenscheid, Scarfone, BIOS Integrity Measurement Guidelines (DRAFT), 2011, NIST Computer Security Division.
Kursawe, Schellekens, Flexible micro-TPMs Through Disembedding, 2009, ACM ASIACCS.
N/A, Foundational Trust for IOT and Resource Constrained Devices, 2017, Trusted Computing Group.
N/A, Hardware Requirements for a Device Identifier Composition Engine, Mar. 22, 2018, Trusted Computing Group.
Brostrom, Zhu, Robucci, Younis, IoT Boot Integrity Measuring and Reporting, Nov. 2018, ACM SIGBED.
Kim, Lee, Ryou, Compact and unified hardware architecture for SHA-1 and SHA-256 of trusted mobile computing, 2012, Pers Ubiquit Comput, Springer-Verlag.
Pendergrass, Helble, Clemens, LOSCOCCO, Maat: A Platform Service for Measurement and Attestation, Sep. 2017, arXiv:1709.10147v1.
Tan, Tsudik, Jha, MTRA: Multiple-Tier Remote Attestation in IoT Networks, 2017, IEEE Conf. on CNS.
N/A, Secure Hash Standard (SHS), 2015, NIST, FIPS Pub 180-4.
Das, Zhang, Liu, Reconfigurable Dynamic Trusted Platform Module for Control Flow Checking, 2014, IEEE Computer Society Annual Symposium on VLSI.
Gu, Ding, Deng, Xie, Mei, Remote Attestation on Program Execution, 2008, ACM.
England, Marochko, Mattoon, Spiger, Thom, Wooten, Apr. 21, 2016, RIoT: A Foundation for Trust in the Internet of Things, Microsoft Corporation.
N/A, Samsung Knox Security Solution, May 2017, Samsung Research America.
Merkle, Secrecy, Authentication, and Public Key Systems, Technical Report No. 1979-1, Jun. 1979, Stanford University.
Shepherd, Arfaoui, Gurulian, Lee, Markantonakis, Akram, Sauveron, Conchon, Secure and Trusted Execution: Past, Present and Future—A Critical Review in the Context of the Internet of Things and Cyber-Physical Systems, 2016, IEEE TrustCom-BigDataSE-ISPA.
Beaulieu, Shors, Smith, Treatman-Clark, Weeks, Wingers, The Simon and Speck Families of Lightweight Block Ciphers, 2013, National Security Agency.
Wang, Shi, Peng, Zhang, Zhao, Yan, Yu, Zhang, Survey on Key Technology Development and Application in Trusted Computing, Nov. 2016, China Communications.
N/A, Implicit Identity Based Device Attestation, Mar. 5, 2018, Trusted Computing Group.
N/A, Trusted Platform Module Library Part 1: Architecture, Sep. 29, 2016, Trusted Computing Group.
Akram, Markantonakis, Mayes, Trusted Platform Module for Smart Cards, 2014, IEEE.

* cited by examiner

SYSTEM AND METHOD FOR MEASURING AND REPORTING IOT BOOT INTEGRITY

CROSS-REFERENCE TO RELATED APPLICATIONS

This application claims priority under 35 U.S.C. § 119(e) to U.S. Provisional Patent Application No. 62/675,991, entitled "System for Measuring and Reporting IoT Boot Integrity," filed May 24, 2018; to U.S. Provisional Patent Application No. 62/744,410, entitled "System for Measuring and Reporting IoT Boot Integrity," filed Oct. 11, 2018; and to U.S. Provisional Patent Application No. 62/793,190, entitled "System for Measuring and Reporting IoT Boot Integrity," filed Jan. 16, 2019.

GOVERNMENT RIGHTS

This invention was made with government support under Contract No. H98230-17-C-0306 awarded by the Information Assurance Research Group in the National Security Agency's Research Directorate. The government may have certain rights in the invention.

FIELD OF THE INVENTION

Embodiments of the present invention relate to an improved system and method of producing, recording and reporting boot integrity measurements of an Internet of Things ("IoT") computing device to an external resource provider (such as a printer, a network router, or a server), so the provider can confirm that the IoT computing device can be trusted before access to the provider's resource(s) is granted. More particularly, embodiments of the present invention provide a new and less expensive architecture for reliably collecting and relaying device state information to support trust-sensitive applications. Device state information may include the identities of components such as hardware and firmware modules. When such device state information is relayed to a resource provider, access control decisions can be made with trusted evidence.

BACKGROUND

The massive integration of computers in all aspects of the human life is to be credited for improving such enterprises as manufacturing, trade, healthcare, travel, entertainment, and government services. One of the key advantages of computer integration is the flexibility and adaptability provided by the software. Yet, cyber-attacks exploit such flexibility through a variety of means to inject malicious modules, e.g., adware, spyware, ransomware. Not only the operation of the computers could be altered by a malicious software module, but also important information could be acquired. The consequences could be dramatic and could potentially constitute a threat to national security. For example, altering the control algorithms for a nuclear reactor could lead to a disaster. Moreover, the effect of private and/or confidential information leakage can put individuals, businesses, and nations at risk. For example, letting classified documents and business bids flow into the hands of an adversary could create serious security and economic threats. Unknowingly allowing access to personal data maintained by government agencies could not only violate the privacy of citizens but could also make them susceptible to physical crimes and identity theft.

One of the subtle venues for injecting malicious modules into computing devices is through software updates—for example, via changes in long-term, non-volatile memory. Being able to load an unauthorized operating system update is a very serious scenario. In fact, with the increased popularity of flash memory, this scenario is applicable to firmware as well. Preventing unauthorized updates would naturally be the intuitive approach, but when update prevention fails, detection is essential. Detection is also necessary to identify obsolete firmware, even though it was authorized at some point in the past. To support detection, the technical community, via the Trusted Computing Group ("TCG"), has produced specifications for measuring and reporting platform integrity. The TCG's flagship specification on the Trusted Platform Module ("TPM") constitutes the industry-adopted solution for enterprise PCs, servers and embedded systems. The TPM specification defines how to measure and attest platform integrity. A hardware implementation of the TPM is preferred, and many vendors offer TPM chips that can be included in the design of computing hardware and interfaced as a peripheral to the processor.

While the TPM has grown into a sophisticated and complex hardware security module, as evidenced by its large, four-volume specification, it retains a simple objective at its core: to provide methods for collecting and reporting the identities of hardware and software components that comprise a computing platform.

Figure 1:
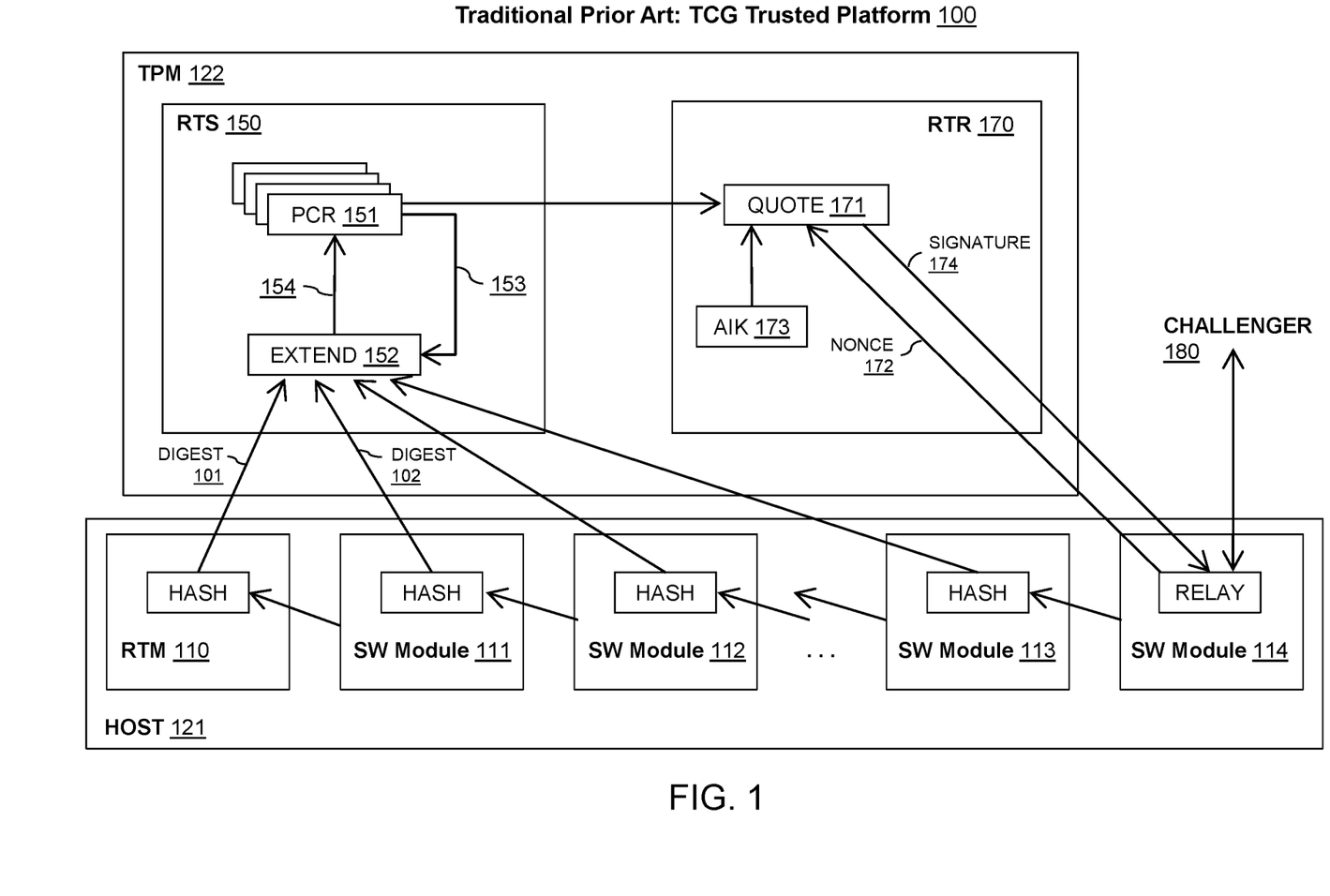
FIG. 1 is a block diagram illustrating a traditional trusted platform in accordance with the prior art.

FIG. 1 is a block diagram illustrating a traditional TCG trusted platform in accordance with the prior art. A traditional TCG trusted platform 100 comprises three major components: (1) a Root of Trust for Measurement ("RTM") 110 implemented on a host, such as Host 121; (2) a Root of Trust for Storage ("RTS") 150 implemented on a trusted device, such as TPM 122; and (3) a Root of Trust for Reporting ("RTR") 170, also implemented on a trusted device, such as TPM 122. When a trusted platform such as TCG trusted platform 100 boots, the RTS 150 initializes each of its Platform Configuration Registers ("PCR") 151. A PCR is an isolated memory sized to hold the result of a cryptographic hash function, commonly called a digest. The digest is considered statistically unique and is used as an identifier. The TPM 122, via RTS 150, protects the PCR 151 from arbitrary modification by the host 121, to which the TPM 122 is attached. The RTM 110 produces the first digest 101 of software module 111 on the host 121 and delivers digest 101 to the RTS's EXTEND function 152 to update the PCR(s) 151 selected by the RTM 110. Extending a digest to a PCR 151 is done as follows:

$$PCR_{new} = H(PCR_{old} \| digest),$$

where H is a secure hash function, '$\|$' is the concatenation operator, and digest is the hash of the next software module to be executed (such as software module 111), or the next data block to be used in the boot sequence. In the context of the present invention, the term "software module" is used interchangeably with the term "boot module."

The host 121 facilitates delivery and other communication with the TPM 122 via bus architectures such as LPC (Low Pin Count), I²C (Inter-Integrated Circuit), or SPI (Serial-Peripheral Interface). The RTS 150 performs the extend 152 operation by hashing the concatenation of the current value of the selected PCR 153 with the incoming digest 101. The resulting digest 154 is then written back to the selected PCR 151. The RTM 110 then passes control to software module 111 to continue the boot sequence. This process repeats for each software module to be executed. For example, software module 111 produces and delivers digest 102 of software module 112 to the RTS 150 which hashes the concatenation of the current PCR value 153 with digest 102 and writes the result back to the PCR 151.

When all of the SW Modules 111, 112, . . . 114 have executed in sequence, each PCR 151 contains a digest of a subset of the digests of the current module and those that preceded it. Consequently, each PCR is said to contain a Digest of Digests ("DoDs") and the terms are used interchangeably. The contents of the PCRs 151 summarize the boot state of the host as they were derived from the digests of the modules that the host used. The history of digests 101, 102 . . . extended by the RTS 150 is known as an event log and is optionally recorded by non-RoT host software. The integrity of the event log is verified by protected PCRs 151. The process by which a device reliably conveys its boot state to a remote challenger is known as attestation.

The role of the RTR 170 is to quote the PCRs 151 in a manner that a remote challenger such as challenger 180 can trust to perform an assessment. The QUOTE logic 171 hashes the concatenation of the PCRs 151, and a nonce 172 relayed from challenger 180. (In cryptography, a nonce is an arbitrary number that can be used just once in a cryptographic communication. It is often a random or pseudo-random number issued in an authentication protocol to ensure that old communications cannot be reused in replay attacks.) The resulting digest is encrypted using a private Attestation Identity Key (AIK) 173 to form a signature 174. Software module 114 then relays an attestation containing an AIK 173 certificate, signature 174, PCRs 151 and event log to the remote challenger 180.

The remote challenger 180 verifies the AIK 173 certificate via the challenger's own certificate store. The AIK 173 certificate must itself chain back to a previously trusted root certificate. The remote challenger 180 then verifies the signature 174 by decrypting it with the trusted $AIK_{pub}$ (the public key associated with AIK 173) and comparing it to the hash of the PCRs 151 and the remote challenger's nonce 172. If the compare is true, the signature and the items signed—the PCRs and nonce—are valid. To verify the integrity of the event log, the remote challenger 180 can extend each digest 101, 102 . . . (as in Extend 152) to produce expected PCRs. If the expected PCRs match the signed PCRs 151, then the event log is considered accurate. The challenger 180 can make a judgement on the acceptability of the event log digests and/or the PCRs' DoDs.

A key feature of the trusted platform architecture of FIG. 1 is that if a boot module (such as software module 112) is changed, it will be reflected in the DoDs. If that boot module were malicious and wanted to allude detection, it would need to modify the DoDs so that they would appear benign. Since the only modification permitted is Extend, the software module (such as software module 112) would need to calculate a $data_{new}$ and provide it to the RTS's extend so that $H\ (DoDs_{bad}||data_{new})$ produces $DoDs_{good}$. This is mathematically infeasible.

With the increased popularity of small computing devices and applications of IoT, the need for platform integrity grows both in scale and scope. Miniaturized devices are becoming pervasive and are being employed in a wide range of applications. Most notable among IoT applications are those involving the control of physical processes, often referred to as cyber-physical systems. The role of IoT devices in this type of application covers sensing, computation and actuation. Obviously, such a role can be quite critical, and thus verifying the integrity of the configuration and software on these devices can be paramount. However, the constrained design goals and costs of IoT devices makes the incorporation of a fully implemented TPM unsuitable. IoT devices are subject to resource, size, power, and cost constraints; therefore, the standardized TPM-based solution would not be viable, both economically and contextually. Hence, a lightweight approach is needed for IoT devices.

The abovementioned issues have motivated the technical community to develop alternate schemes. The introduction of DICE ("Device Identifier Composition Engine") is among the most notable efforts in that regard. DICE opts to enable attestation without requiring a TPM, in order to limit the required resources. To do so, the DICE process uses a device secret to derive subsequent secrets based on measurements in the boot chain. While the secrets can only be produced on devices with the correct configuration, they (other than the initial device secret) are not protected by a root-of-trust. Consequently, they are susceptible to leakage, copying and reuse. While this risk may be acceptable in some situations, embodiments of the present invention seek to meet the TCG's initial "trusted platform" goals.

SUMMARY OF THE INVENTION

This summary is provided to introduce certain concepts in a simplified form that are further described below in the Detailed Description. This summary is not intended to identify key features or essential features of the claimed subject matter, nor is it intended to limit in any way the scope of the claimed invention.

Embodiments of the present invention overcome the shortcoming of TPM, DICE, and other prior art attempts to provide an effective, yet lightweight, solution for ensuring platform integrity of IoT devices. The embodiments leverage crypto-acceleration modules found on many existing microprocessors and microcontroller-based IoT devices, while introducing little additional overhead. Embodiments provide a Root of Trust module comprising integrated internal control logic that functions as a secure "wrapper" for cryptographic primitive modules such as a hash module and a cypher module, which are integral, not supplemental, components of a host device, and which provide secure storage and reporting of the host's platform integrity measurements.

The above summaries of embodiments of the present invention have been provided to introduce certain concepts that are further described below in the Detailed Description. The summarized embodiments are not necessarily representative of the claimed subject matter, nor do they span the scope of features described in more detail below. They simply serve as an introduction to the subject matter of the various inventions.

BRIEF DESCRIPTION OF THE DRAWINGS

So that the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE EMBODIMENTS

Embodiments of the present invention will be described with reference to the accompanying drawings, wherein like parts are designated by like reference numerals throughout, and wherein the leftmost digit of each reference number refers to the drawing number of the figure in which the referenced part first appears.

Architecture

The cryptographic primitives found in the TPM 122 to support the RTS's 150 Extend and the RTR's 170 Quote operations (see FIG. 1) are hash (e.g., SHA or Secure Hash Algorithm) and public key (asymmetric) ciphers that produce a digital signature (e.g., RSA or Rivest-Shamir-Adleman). Embodiments of the present invention provision the RTS 150 and RTR 170 components of TPM 122 as integral, not supplemental, components to a host, such as host 121. Embodiments may use symmetric or asymmetric cryptography and may make on-chip crypto accelerators function in both general purpose and root of trust modes. Embodiments may further use block ciphers as the basis for hashing and signing. The purpose for doing so is to take advantage of integrated ciphers (e.g., AES) already prevalent in the market (e.g., ST STM32L081xx, TI MSP430 and the Atmel XMEGA) and to be less burdensome for manufacturers.

The logic that drives the cryptographic primitives (e.g., hash and encrypt, a.k.a. "engines") to function in either general purpose or root of trust modes can be thought of as a "wrapper." Such a wrapper would function as a trusted, special-purpose interface to the engines, and would have virtually no disruption to their core logic. Thus, as manufacturers dedicate silicon to these accelerators, they could find that a fractional increase in logic could provide an important level of trust for very little cost. This approach strikes a balance between overhead and robustness and would suit resource constrained IoT devices well.

Supporting the Extend Operation

While a TPM 122 may support multiple PCRs 151 and multiple hashing algorithms, embodiments of the present invention will use a single PCR (for example, PCR 830 in FIG. 8) and a single hashing algorithm. Note that the PCR 830 is to be protected from arbitrary writes and may only be updated with Extend (see Extend 813 in FIG. 8). The initial value of PCR 830 is 0 (or some other provisioned value) and may be reset only upon receiving a full platform reset signal.

As is known in the art, a hash function is any function that can be used to map data of arbitrary size to data of (typically smaller) fixed size. The values returned by a hash function are called hashes, hash values, hash codes, or (more commonly) digests. A required property of secure hashes is that they be "one-way." If a hash function H consumes input A to produce B, H is considered one-way if it is infeasible to create an inverse function that consumes B to produce A.

Figure 2:
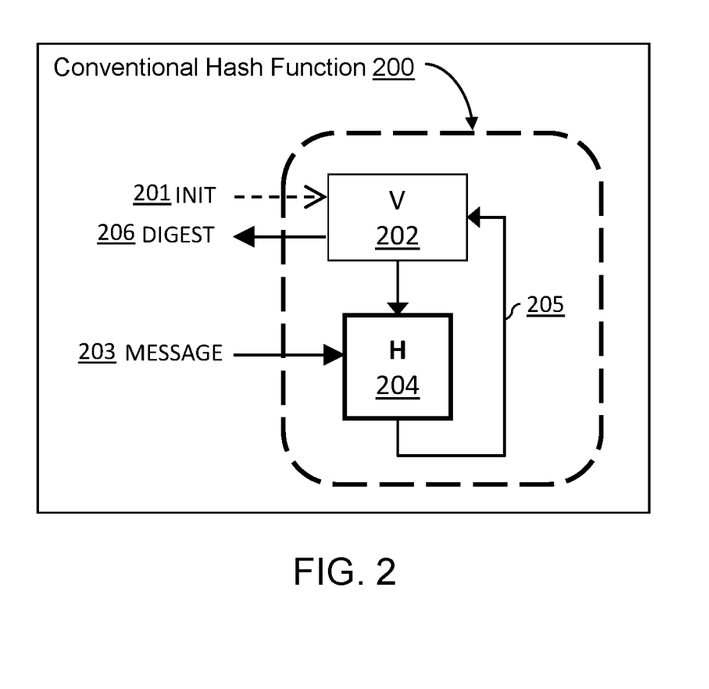
FIG. 2 is a block diagram illustrating an exemplary embodiment of a conventional hash function, in accordance with the present invention.

FIG. 2 is a block diagram illustrating an exemplary embodiment of a conventional hash function 200, in accordance with the present invention. The input to hash function 200 is a message 203 and an initializing value 201. The output of hash function 200 is a digest 206. To produce digest 206, a compression function H 204 repeatedly or iteratively processes fragments of message 203 into a smaller compressed portion 205, until the entire message 203 has been compressed into digest 206. In each iteration, compression function H 204 accepts two inputs: the next fragment of message 203 and an intermediate digest V 202, which is the result of the immediately preceding iteration of H 204 (i.e., the previously compressed portion 205). An example of a conventional hash function 200 is SHA-256. In the case of SHA-256, the size of each fragment of message 203 is 512 bits and the size of V 202 is 256 bits. The result of compressing those 768 bits is 256 bits, matching the size of V 202. When all fragments of message 203 have been processed along with any additional padding and termination, V 202 is returned as message digest 206, which is a digest or a hash of message 203. The initialization value 201 and termination added to 203 for SHA-256 is specified by NIST's FIPS 180-4, Secure Hash Standard.

Figure 3:
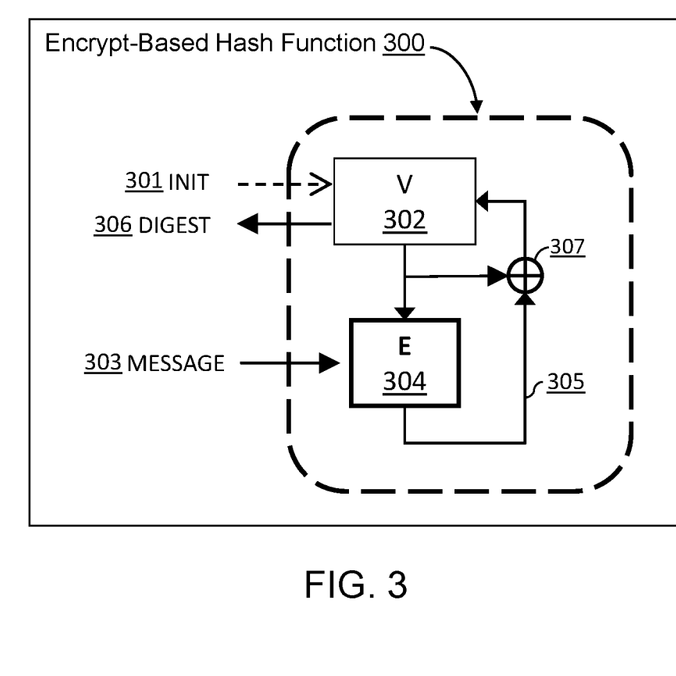
FIG. 3 is a block diagram illustrating an alternative encrypt-based hash function that repurposes an existing block cipher as a replacement to a compression function, according to embodiments of the present invention.

FIG. 3 is a block diagram illustrating an alternative encrypt-based hash function 300 that repurposes a block cipher E 304 as a replacement to compression function H 204 (shown in FIG. 2), according to embodiments of the present invention. The purpose of doing so would allow consolidation of logic for hashing and encrypting, thereby reducing on-chip manufacturing demands. From the perspective of inputs and outputs, encrypt-based hash function 300 is identical to conventional hash function 200. The difference between the two hash functions is: conventional hash function 200 uses a conventional compression function such as found in SHA-256, where encrypt-based hash function 300 uses a Davies-Meyer compression algorithm, $V_i = E_{Mi}(V_{i-1}) \oplus V_{i-1}$, where $M_i$ corresponds to the ith block of message M (M is message 303), $V_{i-1}$ is the result of the previous iteration, $E_{Mi}(V_{i-1})$ is the output of an encrypt function E 304 encrypting $V_{i-1}$ with key Mi, and $\oplus$ is the exclusive-or operator XOR. $V_0$ is set to the initialization value 301.

Continuing to refer to FIG. 3, the input to hash function 300 is a message 303 (corresponding to M in the equation above) and an initializing value 301. The output of hash function 300 is digest 306. To produce digest 306, encrypt function E 304 repeatedly or iteratively encrypts V 302 using a portion of message 303 as key to produce ciphertext 305, and XORing that with V 302 until the entire message 303 has been processed into digest 306. In each iteration, encrypt function E 304 accepts two inputs: the next fragment of message 303 and V 302, which is the result of the immediately preceding iteration of E 304 (i.e., the previously compressed cyphertext 305). The compressed cyphertext 305 is fed to XOR gate 307 along with the original V 302 whose result is then used to overwrite V 302. When all fragments of message 303 have been processed, V 302 is returned as message digest 306, which is a hash of message 303.

Any hash approach—including conventional hash function 200 or encrypt-based hash function 300 utilizing a Davies-Meyer compression algorithm—can be represented at a higher level simply as a HASH "engine" that can be initialized (with some algorithm-dependent value), consume multiple message fragments, and produce a digest as output.

Figure 4:
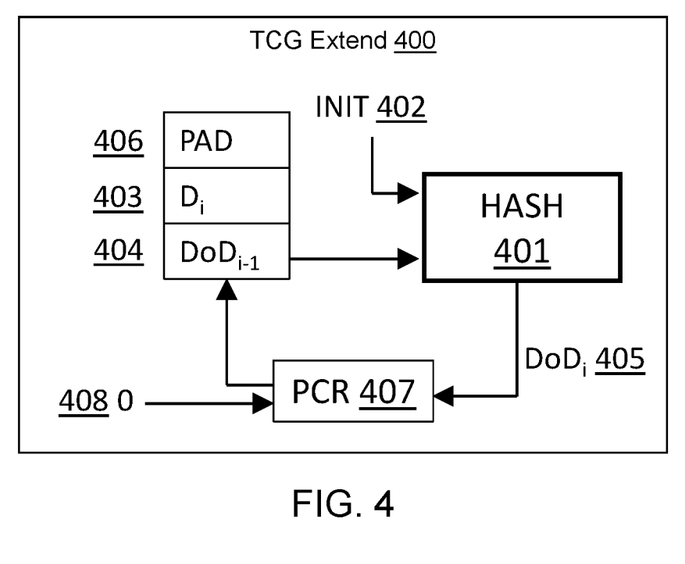
FIG. 4 is a block diagram illustrating a traditional TCG implementation of an Extend operation, in accordance with the prior art.

FIG. 4 is a block diagram illustrating a traditional TCG implementation of an Extend operation, in accordance with the prior art. The TCG's implementation of Extend 400 implements the following iterative algorithm: $DoD_i=H(DoD_{i-1}\|D_i)$, where each $DoD_i$ corresponds to the $i^{th}$ value of one of the PCRs 151 shown in FIG. 1, H is a HASH engine such as described in FIG. 2 (H 204) or 3 (H 304), and where each digest $D_i$ 403 corresponds to one of the digests 101, 102, shown in FIG. 1. $DoD_0$ is specified by the TCG for specific PCRs and is typically either all zeros 408 or all ones. In operation, the hash engine 401 is initialized with Init value 402 and will process as its message fragment inputs $DoD_{i-1}$ 404, $D_i$ 403, and any padding and termination shown as PAD 406, as required by the specific hash algorithm operating within HASH 401. The result 405 of Extend 400 is written back to the PCR 407 (PCR 151).

Figure 5:
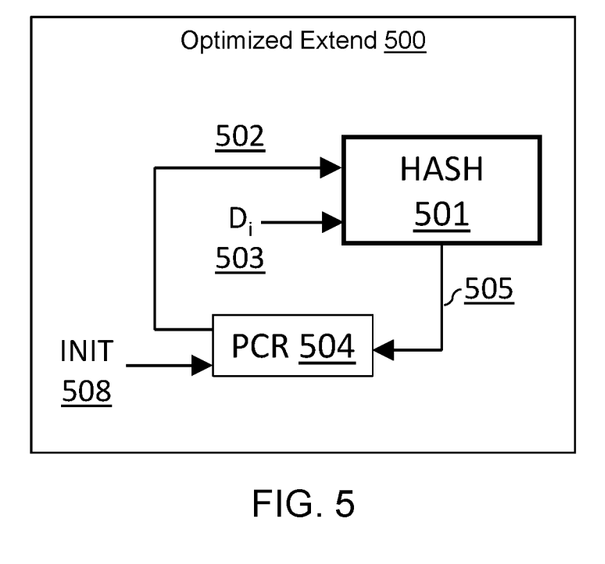
FIG. 5 is a block diagram illustrating an optimized Extend operation, according to embodiments of the present invention.

FIG. 5 is a block diagram illustrating an optimized Extend 500, according to embodiments of the present invention. The purpose of this optimization is to provide a slight improvement over TCG Extend 400 to streamline the concatenation of digests 503, resulting in more efficient control logic. Extend 500 does not initialize and pad for every $D_i$. Instead, it initializes the PCR 504 with the Hash 501 algorithm's initialization value 508 and defers message termination padding (if needed, not shown) to when PCR 504 is read for other uses. Note that some padding of $D_i$ 503 may be required if $D_i$ 503 is smaller than the message fragment input size. The hash engine 501 compresses its initialization value $DoD_i$ 502 from PCR 504 with $D_i$. The result 505 is written back to the PCR 504.

Figure 6:
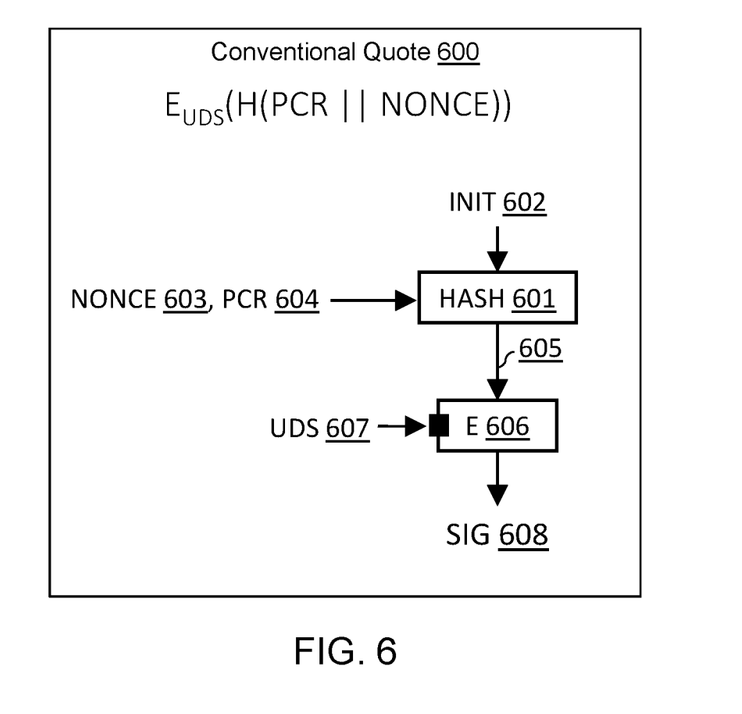
FIG. 6 is a block diagram illustrating a conventional quote mechanism, in accordance with the prior art.

FIG. 6 is a block diagram illustrating a conventional quote mechanism 600, in accordance with the prior art. As described in the Background section above, the conventional Quote mechanism for TPM is shown in FIG. 6. The nonce 603, provided by an external challenger, is hashed with the PCR 604, along with any necessary padding, by the hash engine 601. Instead of updating the PCR 604, the resulting digest 605 is fed as plaintext to an encryption engine E 606. The digest 605 is encrypted with UDS 607. The term "UDS" or Unique Device Secret, in the context of FIG. 6 and embodiments of the present invention, refers to a value either obtained directly or derived from a provisioned secret on the host. The resulting ciphertext is digital signature SIG 608.

Figure 7:
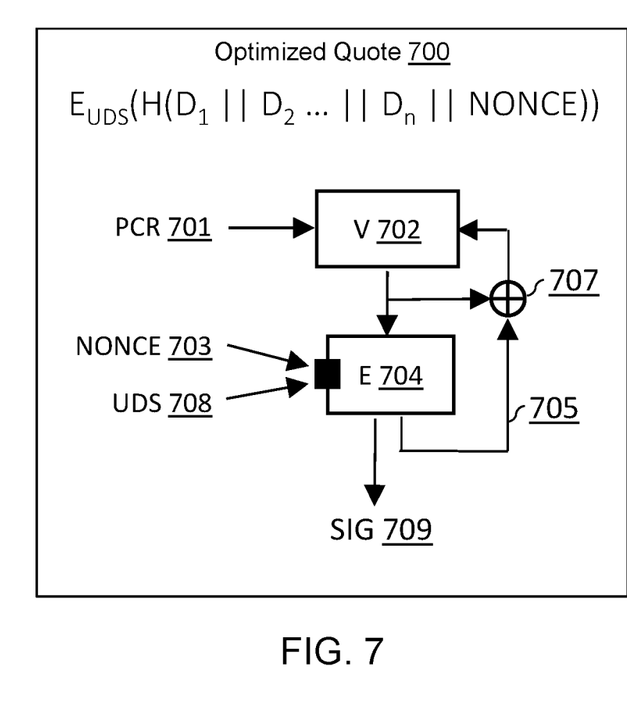
FIG. 7 is a block diagram illustrating an optimized Quote, according to embodiments of the present invention.

FIG. 7 is a block diagram illustrating an optimized Quote 700, according to embodiments of the present invention. To optimize the quoting process, hash engine 601 (in FIG. 6) could use the same encryption logic provided by encrypt-based hash function 300 (FIG. 3). This optimization also benefits from Optimized Extend 500. First, V 702 is initialized with PCR 701 and compressed by E 704 with the nonce 703. The result 705 and the initial V 702 are XORed at 707. That result updates V 702 (but not the PCR 701). Then, V 702 is encrypted by E 704 with the UDS 708 as key. The result is digital signature SIG 709.

Figure 8:
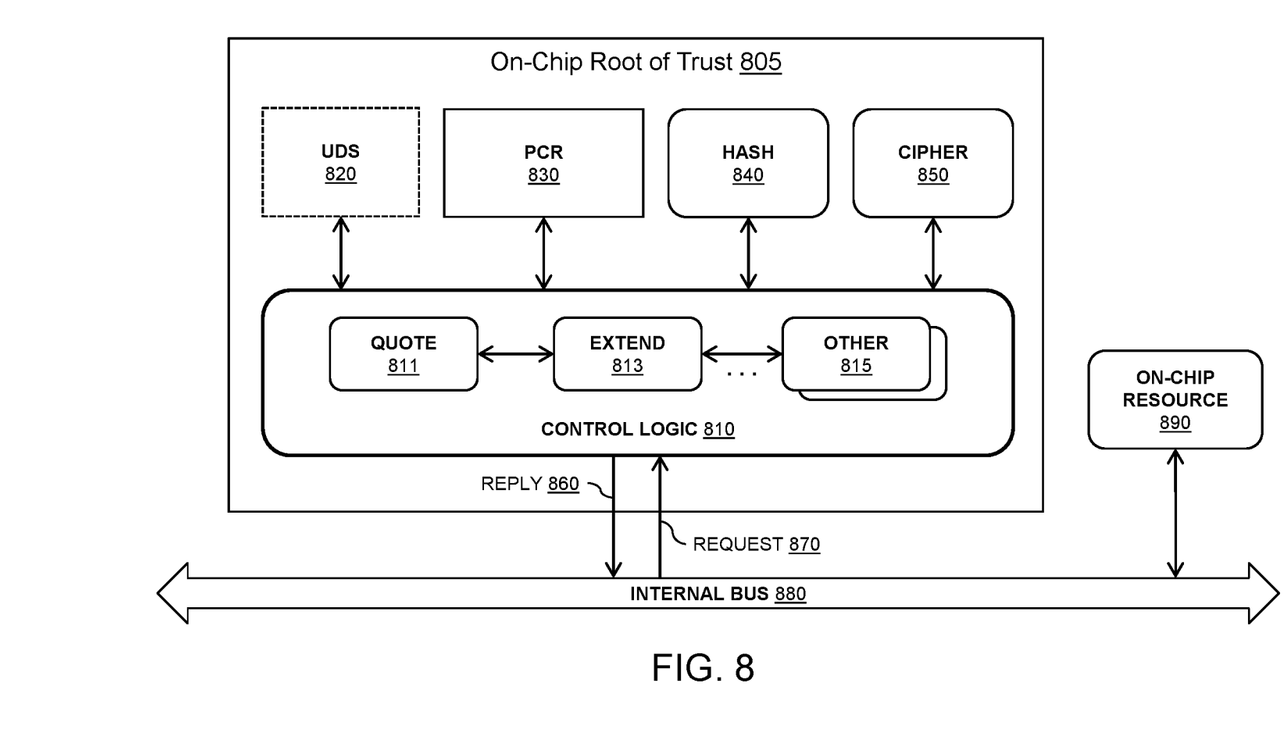
FIG. 8 is a block diagram illustrating the components of a Root of Trust implementation according to embodiments of the present invention.

FIG. 8 is a block diagram of an On-Chip Root of Trust 805, according to embodiments of the present invention. It depicts the components and their interaction as needed to implement an RTS and RTR to support measurement and attestation on the same chip (or die) containing the host processor and its RTM. It is unique in that the same logic a manufacturer might incorporate for general-purpose crypto acceleration, such as Cipher 850, can also be used to implement a root of trust. Control Logic 810 is a state machine that maintains exclusive access and control over all resources within the On-Chip Root of Trust 805. It is also responsible for all interactions (for example, Reply 860 and Request 870) through internal bus 880 with other chip components, shown as On-Chip Resource 890, such as a primary microcontroller. The Root of Trust 805 resources managed by Control Logic 810 are UDS 820 (from UDS 607 or UDS 708), PCR 830 (from PCR 407, PCR 504, PCR 604 or PCR 701), Hash 840 (from Hash 401, Hash 501, or Hash 601) and Cipher 850 (from E 606 or E 704). If Hash 840 is excluded, then Cipher 850 would be controlled by Control Logic 810 to affect a hash function as described in FIG. 3 and used in Hash 401, Hash 501, Hash 601, and E 704.

UDS 820 is read and used exclusively within the On-Chip Root of Trust 805 as required by Control Logic 810. While provisioning of UDS 820 is outside the scope of this disclosure, it may use technologies such as PUFs (Physically Unclonable Functions) or fuses. The bits used to represent UDS 820 may be obfuscated and shielded to thwart extraction. Outside of provisioning, UDS 820 is read-only by Control Logic 810. Whenever UDS 820 is used, such as in FIG. 6 (UDS 607) or 7 (UDS 708), it must be erased from where it was used (such as by E 606 or E 704) to prevent reuse for unauthorized purposes.

While PCR 830's contents are readable and sharable to any On-Chip Resource 890, PCR 830 can only be written by Control Logic 810 during platform reset for initialization or by Extend 813 as shown in FIGS. 4 (via 408 and 405) and 5 (via 508 and 505).

While the On-Chip Root of Trust 805 contains crypto accelerators Hash 840 and Cipher 850, Control Logic 810 will control them for its internal use via Extend 813 and Quote 811, or for indirect, general purpose use by On-Chip Resource 890 via Other 815. When switching between internal and external modes, Control Logic 810 will ensure that no interference or leakage occurs.

Extend 813 control logic is responsible for updating PCR 830 as shown in FIG. 4 (PCR 407) or 5 (PCR 504) to affect the Extend primitive. It will ensure that only the specified inputs are hashed, that only this output is written to PCR 830, and that it is not interruptible. The process will fully complete before responding to any other requests for root of trust or general-purpose services.

Quote 811 control logic is responsible for reading both PCR 830 and UDS 820 as shown in FIGS. 6 (reading PCR 604 and UDS 607) and 7 (reading PCR 701 and UDS 708) to affect the Quote primitive. Quote 811 control logic will ensure that only (PCR 830∥Nonce) is hashed and that only that result is signed by UDS 820. The "Nonce" in (PCR 830∥Nonce) is included in a Quote request transmitted as Request 870 via Internal Bus 880 by On-Chip Resource 890. A resulting signature generated by Quote 811 (for example SIG 709 as shown in FIG. 7) will be returned to On-Chip Resource 890 as Reply 860, also via Internal Bus 880. Any transient copies of UDS 820 (e.g. in Cipher 850 key input) will be erased to help prevent disclosure or reuse. The process will fully complete before responding to any other requests for root of trust or general-purpose services.

Other control logic 815 may be used for other root of trust operations (such as to support sealed storage) or to enable general purpose use of the accelerators.

Figure 9:
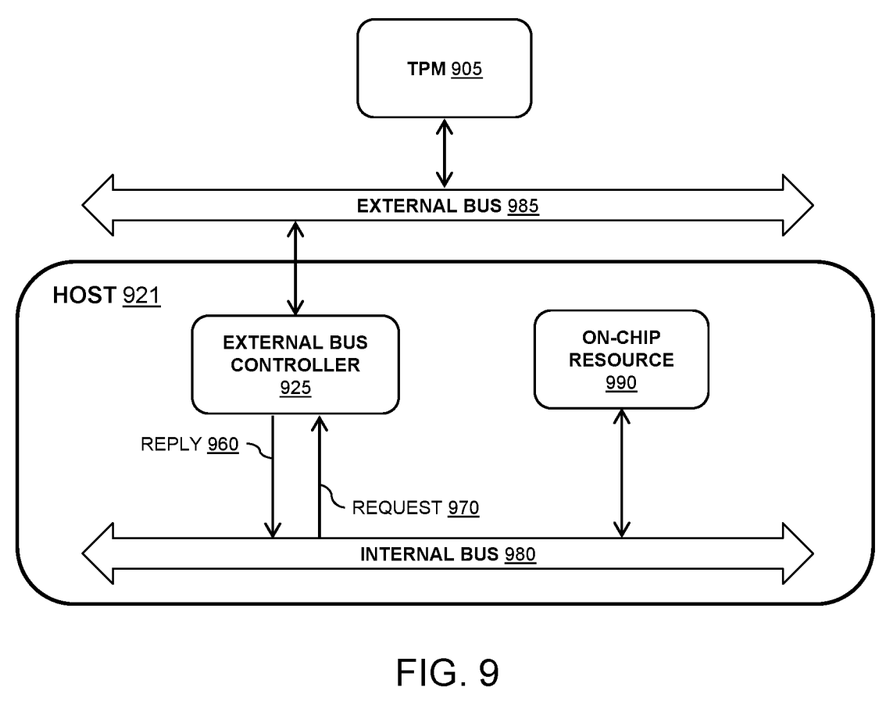
FIG. 9 is a high-level block diagram illustrating a traditional TPM implementation for purposes of comparing the prior art to embodiments of the present invention.

FIG. 9 is a high-level block diagram illustrating a traditional trusted platform implementation for purposes of comparing the prior art to embodiments of the present invention. In a traditional trusted platform implementation, an On-Chip Resource 990 executing on a Host 921 may issue Requests 970 (such as Extend and Quote) to TPM 905. Requests 970 are typically transmitted to TPM 905 from an On-Chip Resource 990 via an Internal Bus 980, then to an External Bus Controller 925, then through an External Bus 985, and finally to the TPM 905. A Reply 960 corresponding to Request 970 will typically be transmitted from TPM 905 to an On-Chip Resource 990 in similar fashion, but in reverse, from TPM 905 to an External Bus 985, then through an External Bus Controller 925 executing on Host 921, and finally through Internal Bus 980 to On-Chip Resource 990. TPM 905 may correspond to TPM 122. External bus 985 may implement a number of bus architectures, including LPC (Low Pin Count), I²C (Inter-Integrated Circuit), or SPI (Serial-Peripheral Interface). These are the same bus architectures that can enable modules executing on Host 121 (such as RTM 110, SW Module 111, and the like) to communicate with TPM 122, as illustrated in FIG. 1. Host 921 may correspond to Host 121. Reply 960 may correspond to Reply 860. Request 970 may correspond to Request 870. Internal Bus 980 may correspond to Internal Bus 880. On-Chip Resource 990 may correspond to On-Chip Resource 890.

Figure 10:
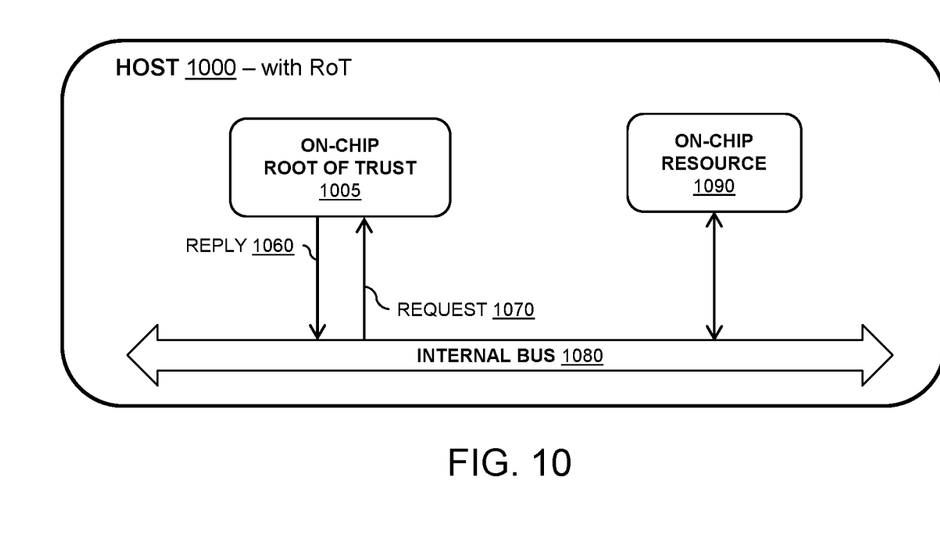
FIG. 10 is a high-level block diagram illustrating an implementation of a host chip with an on-chip root of trust, for purposes of comparing the prior art to embodiments of the present invention.

FIG. 10 is a high-level block diagram illustrating an implementation of a Host Chip 1000 with an On-Chip Root of Trust 1005, for purposes of comparing the prior art (shown in FIG. 9, for example) to embodiments of the present invention. Just as in a traditional trusted platform implementation (see FIGS. 1 and 9), On-Chip Resource 1090 executing on a Host 1000 may issue Requests 1070 (such as Extend and Quote). Rather than being transmitted to an off-chip TPM, such as TPM 905, Requests 1070 may be transmitted to an On-Chip Root of Trust 1005 from an On-Chip Resource 1090 directly through Internal Bus 1080. A Reply 1060 corresponding to Request 1070 may be transmitted from On-Chip Root of Trust 1005 to On-Chip Resource 1090 in similar fashion, but in reverse, directly through Internal Bus 1080. On-Chip Root of Trust 1005 may correspond to On-Chip Root of Trust 805. Reply 1060 may correspond to Reply 860 or Reply 960. Request 1070 may correspond to Request 870 or Request 970. Internal Bus 1080 may correspond to Internal Bus 880 or Internal Bus 980. On-Chip Resource 1090 may correspond to On-Chip Resource 890 or On-Chip Resource 990.

Variations

The present invention can be realized in hardware, software, or a combination of hardware and software. The invention can be realized in a centralized fashion in one computing system, or in a distributed fashion where different elements are spread across several computing systems. Any kind of computer system or other apparatus adapted for implementing the limitations described herein is suitable.

Although the present disclosure provides certain embodiments, other embodiments apparent to those of ordinary skill in the art, including embodiments that do not provide all the features and advantages set forth herein, are also within the scope of this disclosure.

The foregoing disclosure has been set forth merely to illustrate the invention and is not intended to be limiting. It will be appreciated that modifications, variations and additional embodiments are covered by the above teachings and within the purview of the appended claims without departing from the spirit and intended scope of the invention. Other logic may also be provided as part of the exemplary embodiments but are not included here so as not to obfuscate the present invention. Since modifications of the disclosed embodiments incorporating the spirit and substance of the invention may occur to persons skilled in the art, the invention should be construed to include everything within the scope of the appended claims and equivalents thereof.

The invention claimed is:

1. A computing hardware Root of Trust module, comprising:
   integrated internal control logic operable only within the Root of Trust module;
   an internal bus for receiving requests from on-chip computing resources and for providing responses to the requests, said internal bus in communication with the internal control logic via an internal bus interface;
   a provisioned read-only Unique Device Secret (UDS) accessible only by the internal control logic within the Root of Trust module;
   a one-way hash module operable only by the internal control logic, said one-way hash module producing a hash digest from a hash input message;
   a cipher module accessible only by the internal control logic, said cipher module producing an encrypted ciphertext from a cipher input message;
   a Platform Configuration Register (PCR) updatable only by the internal control logic, said PCR initialized to a provisioned default value only upon receiving a device reset signal;
   an Extend module comprising circuitry to perform an extend operation under control of the internal control logic in response to an extend request received from any of the on-chip computing resources via the internal bus, said circuitry invoking the one-way hash module to (a) cryptographically blend the current contents of the PCR with a message digest provided in the extend request, said hash input message comprising a concatenation of the current contents of the PCR and the message digest, and (b) storing the result of the cryptographic blend operation back into the PCR;
   a Quote module comprising circuitry to perform a quote operation under control of the internal control logic in response to a quote request received from any one of the on-chip computing resources via the internal bus to create a digital signature by encrypting, using the cipher module with the UDS as a key, a blend of (a) a nonce received in the quote request, and (b) the current contents of the PCR.

2. The computing hardware Root of Trust module of claim 1, wherein the integrated internal control logic comprises the one-way hash module and the cipher module.

3. The computing hardware Root of Trust module of claim 1, wherein the one-way hash module comprises an encrypt-based hash function.

4. The computing hardware Root of Trust module of claim 3, wherein the encrypt-based hash function comprises a Davies-Meyer hash function.

* * * * *